(12) United States Patent
Wang et al.

(10) Patent No.: US 11,773,274 B2
(45) Date of Patent: Oct. 3, 2023

(54) ENVIRONMENTAL-FRIENDLY ANTIFOULING AGENT AND ANTIFOULING PAINT, MULTI-LAYER PROTECTIVE FILM STRUCTURE AND USE THEREOF

(71) Applicant: NINGBO INSTITUTE OF MATERIALS TECHNOLOGY & ENGINEERING, CHINESE ACADEMY OF SCIENCES, Ningbo (CN)

(72) Inventors: Liping Wang, Ningbo (CN); Guangming Lu, Ningbo (CN); Shuan Liu, Ningbo (CN); Jibin Pu, Ningbo (CN)

(73) Assignee: NINGBO INSTITUTE OF MATERIALS TECHNOLOGY & ENGINEERING, CHINESE ACADEMY OF SCIENCES, Ningbo (CN)

( * ) Notice: Subject to any disclaimer, the term of this patent is extended or adjusted under 35 U.S.C. 154(b) by 40 days.

(21) Appl. No.: 17/595,836

(22) PCT Filed: Nov. 2, 2020

(86) PCT No.: PCT/CN2020/125776
§ 371 (c)(1),
(2) Date: Nov. 26, 2021

(87) PCT Pub. No.: WO2022/082850
PCT Pub. Date: Apr. 28, 2022

(65) Prior Publication Data
US 2023/0145043 A1 May 11, 2023

(30) Foreign Application Priority Data
Oct. 23, 2020 (CN) .......................... 202011142150.8

(51) Int. Cl.
C09D 5/16 (2006.01)
C08K 5/33 (2006.01)
C09D 5/08 (2006.01)
C09D 133/04 (2006.01)
C08K 5/00 (2006.01)

(52) U.S. Cl.
CPC ............. *C09D 5/1625* (2013.01); *C09D 5/08* (2013.01); *C09D 5/1693* (2013.01); *C09D 133/04* (2013.01); *C08K 5/0091* (2013.01); *C08K 5/33* (2013.01)

(58) Field of Classification Search
CPC ....... C09D 5/1625; C08K 5/0091; C08K 5/33
See application file for complete search history.

(56) References Cited

FOREIGN PATENT DOCUMENTS

| CN | 105255291 A | | 1/2016 |
|---|---|---|---|
| CN | 107814779 A | | 3/2018 |
| CN | 108129425 A | | 6/2018 |
| CN | 109776462 A | | 5/2019 |
| CN | 110325520 A | | 10/2019 |
| JP | 2018090571 A | * | 6/2018 |
| JP | 2018090571 A | | 6/2018 |
| WO | 2012004069 A1 | | 1/2012 |

OTHER PUBLICATIONS

The machine translation into English of JP 2018-090571 A (Year: 2018).*
The STIC search related to Sherlin; Zhurnal Obshcchei Khimii; 1938), 8, 7-15 (Year: 1938).*
Sherlin; Zhurnal Obshcchei Khimii in Russian, (1938), 8, 7-15 (Year: 1938).*
Yongming Xu, et al., Efficient Synthesis of 2,5-Dicyanofuran from Biomass-Derived 2,5-Diformylfuran via an Oximation-Dehydration Strategy, ACS Sustainable Chemistry & Engineering, 2018, pp. 2888-2892, 6(3).
Jinbo Chen, et al., Efficient autocatalytic oximation of bio-based2,5 diformylfuran with aqueous hydroxylamine under mild conditions, Green Chemistry, 2020, pp. 1-14.

* cited by examiner

*Primary Examiner* — Karuna P Reddy
(74) *Attorney, Agent, or Firm* — Bayramoglu Law Offices LLC (57) ABSTRACT

The environmental-friendly antifouling agent includes a furan oxime and/or furan oxime metal complex, which has not only good antifouling performance, low toxicity and high efficiency and environmental friendliness. The ecological toxicity of the non-target organism is less than 15% of that of metals such as copper and chromium and organic matters such as benzoxazole, and the excellent barrier property of the furan ring structure itself on small molecules such as oxygen and water vapor can also significantly improve the barrier effect of a coating on a typical corrosive factor. The antifouling agent combined with an antifouling coating system can greatly improve the corrosion resistance of the coating system. Meanwhile, such the antifouling agent is easy to synthesize, can be well compatible with self-polishing resins, corrosion type resins and the like.

17 Claims, 3 Drawing Sheets

ENVIRONMENTAL-FRIENDLY ANTIFOULING AGENT AND ANTIFOULING PAINT, MULTI-LAYER PROTECTIVE FILM STRUCTURE AND USE THEREOF

CROSS REFERENCE TO RELATED APPLICATIONS

This application is the national phase entry of International Application No. PCT/CN2020/125776, filed on Nov. 2, 2020, which is based upon and claims priority to Chinese Patent Application No. 202011142150.8, filed on Oct. 23, 2020, the entire contents of which are incorporated herein by reference.

TECHNICAL FIELD

The present application relates to an antifouling agent, particularly to an antifouling agent based on furan oxime compounds and/or furan oxime metal complexes and use thereof belonging to the field of antifouling technologies.

BACKGROUND

Marine fouling, as a worldwide phenomenon, causes huge economic loss to global shipping, aquaculture and offshore platform facilities. Only in the aquaculture industry alone, the annual cost for fouling control accounts for 5-10% of the output of the entire aquaculture industry. Coating antifouling paint is the simplest and most economical and effective antifouling means, and the quality of the antifouling agent is a key factor to determine the effect of antifouling paint. Organic tin is an antifouling agent with excellent antifouling effect and cost performance, but it is banned due to its excessive toxicity to non-target organisms and the existence of extremely great risk to human health after enrichment via a food chain. Although the widely used cuprous oxide and some antifouling agents containing metallic zinc have low toxicity to non-target organisms at present, they still have extremely high potential ecological risks. Therefore, an environmental-friendly high-efficiency antifouling agent is an important development direction currently. Selecting natural products and nature-like products with efficient antifouling activity as environmental-friendly high-efficiency antifouling agents is a mainstream way to develop environmental-friendly high-efficiency antifouling agents. However, this method also has serious shortcomings. Firstly, the content of marine natural active products in organisms is extremely low, and the quantity of the marine natural active products sufficient to supply industrial application is difficult to obtain through extraction; secondly, marine natural active products are often complex in structure, are not easily produced on large scale by chemical synthesis, or have expensive chemical synthesis cost, without economy relative to heavy metal-based antifouling agents; and thirdly, development of a marine natural active product based on performance in a lab is long in period and expensive in cost.

SUMMARY

The main objective of the present application is to provide an environmental-friendly antifouling agent and use thereof to overcome the defects in the prior art.

In order to achieve the above objective, the technical solution adopted by the present application is as follows:

The embodiment of the present application provides an environmental-friendly antifouling agent, comprising a combination of any one or more of compounds of formula I-formula VI and isomers of compounds of formula I-formula VI;

wherein, the values of x and y are 0-5, and M comprises Cu, Zn or Ag.

The embodiment of the present application also provides use of compounds of formula I-formula VI or isomers of compounds of formula I-formula VI in preparation of an antifouling agent or antifouling paint.

The embodiment of the present application also provides an environmental-friendly antifouling paint, comprising a resin main body, an antifouling agent and an additive which can be used or not used, wherein the antifouling agent comprises the environmental-friendly antifouling agent.

In some embodiments, the resin main body comprises a self-polishing resin or an abrasive resin.

The embodiment of the present application also provides an antifouling coating formed by the environmental-friendly paint.

The embodiment of the present application also provides a multi-layer protective film structure, comprising at least one anticorrosive coating and at least one antifouling coating which are superposed, wherein the at least one antifouling coating is formed by the environmental-friendly antifouling paint.

The embodiment of the present application also provides a device, comprising a substrate and an antifouling coating covering the substrate, wherein the antifouling coating comprises an antifouling coating formed by the environmental-friendly antifouling paint.

The embodiment of the present application also provides a device, comprising:
 a substrate; and
 a multi-layer protective film structure covering the substrate.

Compared with the prior art, the environmental-friendly antifouling agent provided by the embodiment of the present application has good antifouling performance, low toxicity and high efficiency and environmental friendliness. The ecological toxicity of the environmental-friendly antifouling agent on non-target organisms is less than 15% of that of metals such as copper and chromium and organic matters such as benzoxazole, and the excellent barrier property of the furan ring structure itself on small molecules such as oxygen and water vapor can also significantly improve the barrier effect of a coating on a typical corrosion factor. The antifouling agent combined with an antifouling coating system can greatly improve the corrosion resistance of the coating system. Meanwhile, such the antifouling agent is easy to synthesize, can be well compatible with self-polishing resins, corrosion type resins and the like, is suitable for preparation of antifouling paints and extremely applicable to ships, mariculture facilities and offshore platform facilities, and can efficiently prevent and remove fouling organisms.

BRIEF DESCRIPTION OF THE DRAWINGS

For more clearly illustrating the technical solution of the embodiments of the present application, accompanying drawings used in the embodiments of the present application will be simply discussed below. It should be understood that the following drawings are only for illustrating some embodiment of the present application, and therefore should not be considered as limiting the scope of the present application. Other relevant drawings can also be obtained by persons of ordinary skill in the art according to these drawings without creative efforts.

Reference numbers: 1—carbon steel substrate; 2—anticorrosive coating; 3—antifouling coating.

DETAILED DESCRIPTION OF THE EMBODIMENTS

It should be pointed out that the following detailed descriptions are exemplary, and intended to further illustrate the present application. Unless stated otherwise, all the technical and scientific terms used in the specification have the same meaning commonly understood by persons of ordinary skill in the art.

It is noted that terms used here are only for describing specific embodiment but not limiting exemplary embodiments of the present application. As used here, unless clearly stated otherwise, singular forms are intended to include plural forms. In addition, it should also be understood that when terms "comprise" and/or "include" are used in the specification, they indicate that there are features, steps, operations, devices, components and/or combinations thereof.

An environmental-friendly antifouling agent provided by one aspect of the embodiments of the present application comprises a combination of any one or more of compounds of formula I-formula VI and isomers of compounds of formula I-formula VI;

wherein, the values of x and y are 0-5, and M comprises Cu, Zn or Ag.

In some embodiments, the environmental-friendly antifouling agent consists essentially of: (a) furan oxime of formula I, II or II; (b) furan oxime metal complex of formula IV, V or VI; or a mixture formed of (a), (b) and (c) in any ratio or a set ratio.

In some embodiments, x=y.

In some embodiments, the values of x and y are 0 or 1.

In some embodiments, M is Cu.

In some embodiments, the environmental-friendly antifouling agent can consist of furan oxime of formula I, formula II or formula III alone.

In some embodiments, the environmental-friendly antifouling agent comprises a compound of formula III.

Further, the compound of formula III in the environmental-friendly antifouling agent accounts for more than 50 wt %.

In some embodiments, the environmental-friendly antifouling agent can consist of a furan oxime metal complex of formula IV, formula V or formula VI alone.

Further, in the structures of the compounds of formula V and formula VI, a wavy line at a nitrogen atom side in a C=N double bond represents E-isomers or Z-isomers in which this compound may be present, that is, a furan ring can be present in two different directions (wherein, if —OH and the furan ring are located at two sides of C=N bond, this compound is of E configuration, and if —OH and the furan ring are located at the same side of C=N bond, this compound is of Z configuration). In the structures of the compounds of formula IV, formula V and formula VI, and a dotted line between metal M and oxygen atom represents the possibility of complexing of metal and oxygen atom.

According to embodiments of the present application, the furan oxime metal complex of formula V and formula VI can be formed by complexing forms of E-isomers or Z-isomers with metal elements, or two configurations are present in a form of metal complex mixture.

In some embodiments, the environmental-friendly antifouling agent comprises E-isomers of any one or two of a compound of formula V and a compound of formula VI.

Further, E-isomers of any one or two of the compound of formula V and the compound of formula VI in the environmental-friendly antifouling agent accounts for more than 50 wt %.

Further, the environmental-friendly antifouling agent comprises E-isomers and Z-isomers of any one or two of the compound of formula V and the compound of formula VI, and the E-isomers account for more than 50 wt % that of total content of the E-isomers and the Z-isomers.

The environmental-friendly antifouling agent provided by the above embodiments of the present application has low ecological toxicity and is capable of efficiently preventing and removing antifouling organisms. The EC50 of the environmental-friendly antifouling agent in ecological toxicity assessment with *Vibrio fischeri* as a model organism is no less than 8 times that of typical heavy metals such as Cu and Hg, and is no less than 15 times that of typical organic compounds such as benzopyrene.

Another aspect of the embodiment of the present application provides use of compounds of formula I-formula VI or isomers of compounds of formula I-formula VI in preparation of an antifouling agent or an antifouling paint.

Another aspect of the embodiment of the present application provides use of the environmental-friendly antifouling agent in preparation of an antifouling paint.

Another aspect of the embodiment of the present application provides an environmental-friendly antifouling paint, comprising a resin main body, an antifouling agent and additives which can be used or not used, wherein the antifouling agent comprises the environmental-friendly antifouling agent.

In some embodiments, the resin main body comprises but is not limited to self-polishing resins or abrasive resins.

For example, the self-polishing resin comprises but is not limited to an acrylic resin or a methyl methacrylate resin.

For example, the abrasive resin comprises but is not limited to an acrylic resin, a chlorinated rubber, a chlorinated olefin resin or a styrene/butadiene copolymer resin.

In some embodiments, the additive comprises but is not limited to a combination of any one or more of an extender, a solvent, a spontaneous an accelerator, a carrier, an emulsifier, a dispersant, an antifreeze, a biocide and a thickener. In the embodiment of the present application, these added additives are mainly used for regulating the property of the paint, but they themselves have no any biological effect.

In some embodiments, the content of the antifouling agent in the antifouling paint is less than 20 wt %. Preferably, the content of the antifouling agent in the antifouling paint is 10 wt %-20 wt %.

When the antifouling paint provided by the embodiment of the present application is applied to facilities such as ship hull, aquaculture facilities and offshore platforms, after undergoing one peak biological growth season, the growth area of the fouling organism is not higher than 15% of a coating area.

In the process of practical use, the antifouling paint provided by the embodiment of the present application can be brushed on the surface of the antifouling coating, and both of them are used together.

Another aspect of the embodiment of the present application provides a device, comprising a substrate and an antifouling coating covering the substrate, wherein the antifouling coating comprises an antifouling coating formed by the environmental-friendly paint.

Further, the embodiment of the present application is not particularly limited to the used substrate, mainly a substrate with certain requirements for antifouling performance in water, the substrate includes but is not limited to steel, aluminum, wood, natural or synthetic fiber, polymer, etc. For example, the substrate may be a substrate in contact with seawater, including but not limited to ship shell, aquaculture facilities (fishing gear such as rope, fishing net, float or buoy, etc.), bay shore roads, subsea tunnel, etc.

Next, the present application will be further described by way of examples, but the present application is not limited to the scope of the examples. Unless otherwise specified, the reagents and raw materials used in the following examples are commercially available, and the test methods without specific conditions are usually in accordance with the conventional conditions or the conditions recommended by each manufacturer. In addition, unless otherwise specified, all of the experimental method, detection method and preparation method disclosed in the present application adopt the conventional technology in the art. These techniques have been well described in the existing literature.

For example, in the following examples, involved rest articles except the antifouling agent composition, including the resin, the pigment, the solvent and the substrate, are obtained from the corresponding supplier.

In the following examples, for furan oxime of formula I and formula II, if $x=y=0$, its synthesis process can refer to documents, such as "Efficient autocatalytic oximation of bio-based 2,5-diformylfuran with aqueous hydroxylamine under mild conditions", <<Green Chemistry>>, 2020, Issue 13. The nuclear magnetism characterization information of its product is as follows: $^1$H NMR (400 MHz, DMSO-d6, δ (ppm)): 11.40 (2H, s, 2 oxime-OH); 8.01 (2H, s, 2 iminic proton); 6.77 (2H, s, 2 furan proton); $^{13}$C NMR (100 MHz, DMSO-d6, δ (ppm)): 149.10, 139.18, 113.68.

For furan oxime of formula I, if $x=y=1, 2, 3, 4$ or 5, its synthesis process can comprise the following steps:

the corresponding furan aldehyde (for example, 2,5-furan diacetaldehyde, 2,5-furan dipropionaldehyde, 2,5-furan dibutyraldehyde, 2,5-furan divaleraldehyde and 2,5-furan diacetal aldehydes can be purchased from Ningbo Beiosi Biotechnology Co., Ltd.) and hydroxylamine hydrochloride were evenly mixed in a solvent (for example, deionized water), the molar ratio of furan aldehyde to hydroxylamine hydrochloride was 1:2.5-3.5, and anhydrous sodium acetate was added as an alkali auxiliary agent, the molar ratio of anhydrous sodium acetate to hydroxylamine hydrochloride was 1:1-2, and the oximation reaction was conducted for about 2 h at room temperature, and a large amount of white precipitates were precipitated out, filtered and dried to obtain target products.

The nuclear magnetism characterization information of one of target products ($x=y=1$) is as follows: $^1$H-NMR (400 MHz, CDCl$_3$, ppm): 11.01 (—OH, 2H), 6.53 (CHN, 2H), 5.99 (CH—, furan ring, 2H), 3.24 (—CH$_2$, 4H); $^{13}$C-NMR (400 MHz, CDCl$_3$, ppm): 107.4, 153.9, 150.9, 24.9.

The nuclear magnetism characterization information of one of target products ($x=y=3$) is as follows: $^1$H-NMR (400 MHz, CDCl$_3$, ppm): 11.01 (—OH, 2H), 6.53 (CHN, 2H), 5.99 (CH—, furan ring, 2H), 2.38 (—CH$_2$, 4H), 2.11 (—CH$_2$, 4H), 1.64 (—CH$_2$, 4H); $^{13}$C-NMR (100 MHz, CDCl$_3$, ppm): 106.0, 151.3, 152.5, 21.4, 23.8, 38.7.

The nuclear magnetism characterization information of one of target products ($x=y=5$) is as follows: $^1$H-NMR (400 MHz, CDCl$_3$, ppm): 11.01 (—OH, 2H), 6.53 (CHN, 2H), 5.99 (CH—, furan ring, 2H), 2.38 (—CH$_2$, 4H), 2.11 (—CH$_2$, 4H), 1.59 (—CH$_2$, 4H), 1.47 (—CH$_2$, 4H), 1.29 (—CH$_2$, 4H); $^{13}$C-NMR (100 MHz, CDCl$_3$, ppm): 105.6, 150.3, 152.5, 24.2, 24.6, 28.7, 27.3, 34.1.

For furan oxime of formula II, if $x=y=1, 2, 3, 4$ or 5, its synthesis process can comprise the following steps:

the corresponding furan aldehyde (for example, 2,5-furan diacetaldehyde, 2,5-furan dipropionaldehyde, 2,5-furan dibutyraldehyde, 2,5-furan divaleraldehyde and 2,5-furan diacetal aldehydes) and hydroxylamine hydrochloride were evenly mixed in a solvent (for example, deionized water), the molar ratio of furan aldehyde to hydroxylamine hydrochloride was 1:2.5-3.5, and anhydrous sodium acetate was added as an alkali auxiliary agent, the molar ratio of anhydrous sodium acetate to hydroxylamine hydrochloride was 1:1-2, and an oximation reaction was conducted for about 2 h at room temperature, and a large amount of white precipitates were precipitated out, filtered and dried to obtain target products.

The nuclear magnetism characterization information of one of target products ($x=y=1$) is as follows: $^1$H-NMR (400 MHz, CDCl$_3$, ppm): 11.01 (—OH, 2H), 6.53 (CHN, 2H), 5.99 (CH—, furan ring, 2H), 3.24 (—CH$_2$, 4H); $^{13}$C-NMR (400 MHz, CDCl$_3$, ppm): 107.4, 153.9, 150.9, 24.9.

The nuclear magnetism characterization information of one of target products ($x=y=3$) is as follows: $^1$H-NMR (400 MHz, CDCl$_3$, ppm): 11.01 (—OH, 2H), 6.53 (CHN, 2H), 5.99 (CH—, furan ring, 2H), 2.38 (—CH$_2$, 4H), 2.11

(—CH$_2$, 4H), 1.64 (—CH$_2$, 4H); $^{13}$C-NMR (400 MHz, CDCl$_3$, ppm): 106.0, 151.3, 152.5, 21.4, 23.8, 38.7.

The nuclear magnetism characterization information of one of target products (x=y=5) is as follows: $^1$H-NMR (400 MHz, CDCl$_3$, ppm): 11.01 (—OH, 2H), 6.53 (CHN, 2H), 5.99 (CH—, furan ring, 2H), 2.38 (—CH$_2$, 4H), 2.11 (—CH$_2$, 4H), 1.59 (—CH$_2$, 4H), 1.47 (—CH$_2$, 4H), 1.29 (—CH$_2$, 4H); $^{13}$C-NMR (400 MHz, CDCl$_3$, ppm): 105.6, 150.3, 152.5, 24.2, 24.6, 28.7, 27.3, 34.1.

For furan oxime of formula III, if x=y=0, its synthesis process can comprise the following steps:

the corresponding furan aldehyde (2,5-furan diformaldehyde) and hydroxylamine hydrochloride were evenly mixed in a solvent (for example deionized water), the molar ratio of furan aldehyde to hydroxylamine hydrochloride was 1:2.5-3.5, and anhydrous sodium acetate was added as an alkali auxiliary agent, the molar ratio of anhydrous sodium acetate to hydroxylamine hydrochloride was 1:1-2, and an oximation reaction was conducted for about 2 h at 50° C.-70° C., and a large amount of white precipitates were precipitated out, filtered and dried to obtain a target product, and its nuclear magnetism characterization information is as follows: $^1$H NMR (400 MHz, DMSO-d6, δ (ppm)): 12.06 (2H, s, 2 oxime-OH), 7.57 (2H, s, 2 iminic proton), 7.31 (2H, s, 2 furan proton); $^{13}$C NMR (100 MHz, DMSO-d6, δ (ppm)): 144.91, 135.59, 118.77.

For furan oxime of formula III, if x=y=1, 2, 3, 4 or 5, its synthesis process can comprise the following steps:

the corresponding furan aldehyde (for example, 2,5-furandiacetaldehyde, 2,5-furandipropionaldehyde, 2,5-furandibutyraldehyde, 2,5-furandivaleraldehyde, and 2,5-furandihexanal) and hydroxylamine hydrochloride were evenly mixed in a solvent (for example deionized water), the molar ratio of furan aldehyde to hydroxylamine hydrochloride was 1:2.5-3.5, and anhydrous sodium acetate was added as an alkali auxiliary agent, the molar ratio of anhydrous sodium acetate to hydroxylamine hydrochloride was 1:1-2, and an oximation reaction was conducted for about 2 h, and a large amount of white precipitates were precipitated out, filtered and dried to obtain target products.

The nuclear magnetism characterization information of one of target products (x=y=1) is as follows: $^1$H-NMR (400 MHz, CDCl$_3$, ppm): 11.01 (—OH, 2H), 6.53 (CHN, 2H), 5.99 (CH—, furan ring, 2H), 3.24 (—CH$_2$, 4H); $^{13}$C-NMR (400 MHz, CDCl$_3$, ppm): 105.9, 153.9, 107.4, 30.9.

The nuclear magnetism characterization information of one of target products (x=y=3) is as follows: $^1$H-NMR (400 MHz, CDCl$_3$, ppm): 11.01 (—OH, 2H), 6.53 (CHN, 2H), 5.99 (CH—, furan ring, 2H), 2.38 (—CH$_2$, 4H), 2.11 (—CH$_2$, 4H), 1.64 (—CH$_2$, 4H); $^{13}$C-NMR (100 MHz, CDCl$_3$, ppm): 152.5, 106.0, 151.3, 27.4, 23.8, 38.7.

The nuclear magnetism characterization information of one of target products (x=y=5) is as follows: $^1$H-NMR (400 MHz, CDCl$_3$, ppm): 11.01 (—OH, 2H), 6.53 (CHN, 2H), 5.99 (CH—, furan ring, 2H), 2.38 (—CH$_2$, 4H), 2.11 (—CH$_2$, 4H), 1.59 (—CH$_2$, 4H), 1.47 (—CH$_2$, 4H), 1.29 (—CH$_2$, 4H); $^{13}$C-NMR (100 MHz, CDCl$_3$, ppm): 152.5, 105.6, 150.3, 30.2, 24.6, 28.7, 27.3, 34.1.

For the furan oxime metal complex of formula IV, if x=y=0, the synthesis process can comprise the following steps: a solution containing furan oxime (x=y=0) of formula III was prepared, the pH value was adjusted to 2.0-7.5, and a solution containing transition metal salt (copper chloride solution, copper sulfate solution or zinc chloride solution) was prepared and added into the furan oxime solution in batches, the molar ratio of furan oxime to transition metal salt was 4-6:1, and the target product was obtained by coordination reaction at room temperature for about 5 h, filtration and drying. For the target product in which contained M is Cu, its elemental analysis (mass percentage) data are as follows: C, 47.39%, n, 14.31%, O, 28.10%, and Cu, 10.19%.

For the furan oxime metal complex of formula IV, if x=y=1, 2, 3, 4 or 5, its synthesis process can comprise the following steps: a solution containing furan oxime of formula III (x=y=1, 2, 3, 4 or 5) was prepared, the pH value was adjusted to 2.0-7.5, and a solution containing transition metal salts (such as copper chloride solution, copper sulfate solution or zinc chloride solution) was prepared, the solution of furan oxime was added in batches, the molar ratio of furan oxime to metal salt is 1-2:1, a target product was obtained by coordination reaction for about 5 h, filtration and drying.

One of the target products (x=y=1), M is Cu, and the elemental analysis (mass percentage) data are as follows: C, 48.46%, H, 4.85%, n, 14.18%, O, 24.29%, and Cu, 8.04%.

One of the target products (x=y=1), M is Zn, and the elemental analysis (mass percentage) data are as follows: C, 48.52%, H, 4.84%, n, 14.15%, O, 24.24%, and Cu, 8.25%.

One of the target products (x=y=5), M is Cu, and the elemental analysis (mass percentage) data are as follows: C, 62.04%, H, 8.30%, n, 9.04%, O, 15.49%, Cu, 5.13%.

For the furan oxime metal complex of formula V, if x=y=0, the synthesis process can comprise the following steps: a solution containing furan oxime (x=y=0) of formula I (or formula II or III) was prepared, the pH value was adjusted to 2.0-7.5, preparing a solution containing metal salts (such as copper chloride solution, zinc chloride solution or silver nitrate solution) was prepared and added into the furan oxime solution in batches, the molar ratio of furan oxime to metal salt was 1-2:1, the coordination reaction was conducted for 5 h, and the target product was obtained by filtration and drying. For the target product where contained M is Cu, the elemental analysis (mass percentage) data are as follows: C, 34.92, n, 12.03, O, 24.31, and Cu, 27.60.

For the furan oxime metal complex of formula V, if x=y=1, 2, 3, 4 or 5, the synthesis process can comprise the following steps: a solution containing furan oxime (x=y=1, 2, 3, 4 or 5) of formula I (or formula II or III) was prepared, the pH value was adjusted to 2.0-7.5, and a solution containing metal salts (such as copper chloride solution, zinc chloride solution or silver nitrate solution) was prepared, the solution of furan oxime was added in batches, the molar ratio of furan oxime to copper chloride was 1-2:1, the coordination reaction was conducted for about 5 h, and the target product was obtained by filtration and drying.

One of the target products (x=y=1), M is Cu, and the elemental analysis (mass percentage) data are as follows: C, 41.78%, H, 4.29%, n, 10.83%, O, 18.55%, and Cu, 24.56%.

One of the target products (x=y=3), M is AG, and the elemental analysis (mass percentage) data are as follows: C, 43.47%, H, 5.33%, n, 7.80%, O, 13.36%, and Ag 30.03%.

One of the target products (x=y=3), M is Zn, and the elemental analysis (mass percentage) data are as follows: C, 49.31%, H, 6.05%, n, 8.85%, O, 15.16%, and Zn 20.65%.

One of the target products (x=y=5), M is Cu, and the elemental analysis (mass percentage) data are as follows: C, 55.04%, H, 7.34%, n, 7.55%, O, 12.94%, and Cu, 17.13%.

For the furan oxime metal complex of formula VI, if x=y=0, the synthesis process can comprise the following steps:

A solution containing furan oxime (x=y=0) of formula I (or formula II or III) was prepared, the pH value was adjusted to 2.0-7.5, a solution containing metal salt (such as silver chloride solution or silver nitrate solution) was prepared and added into the solution of furan oxime in batches, the molar ratio of furan oxime to metal salt was 1-2:1, the coordination reaction was conducted for about 5 h, and the target product was obtained by filtration and drying. For the target product where contained M is Ag, the elemental analysis (mass percentage) data are as follows: C 27.61%, H, 1.93%, n, 10.73%, O, 18.39%, and Ag 41.33%.

For the furan oxime metal complex of formula VI, if x=y=1, 2, 3, 4 or 5, the synthesis process can comprise the following steps:

A solution containing furan oxime (x=y=1, 2, 3, 4 or 5) of formula I (or formula II or III) was prepared, the pH value was adjusted to 2.0-7.5, a solution containing metal salt (such as copper chloride solution, zinc chloride solution, silver chloride solution or silver nitrate solution) was prepared and added into the solution of furan oxime in batches, the molar ratio of furan oxime to metal salt was 1-2:1, the coordinate reaction was conducted for about 5 h, and the target product was obtained by filtration and drying.

One of the target products (x=y=1), M is Ag, and the elemental analysis (mass percentage) data are as follows: C, 33.24%, H, 3.14%, N, 9.69%, O, 16.61%, and Cu, 37.32%.

One of the target products (x=y=5), M is Cu, and the elemental analysis (mass percentage) data are as follows: C, 53.84%, H, 7.06%, N, 7.85%, O, 13.45%, and Cu, 17.80%.

For example, in the following examples, the antifouling paint can be prepared using the same preparation device and method as those of well-known common antifouling paint. For example, the antifouling paint is obtained by selecting the resin type in advance, adding the selected resin, the designed environmental-friendly antifouling agent and other additives used as required into the solvent at one time or in turn, stirring and mixing.

For example, in the following examples, the antifouling coating after fully and evenly mixing and grinding each component can be coated on a substrate (the substrate can be an antifouling object or a coated object) by using coating methods or coating tools including but not limited to air spraying, airless spraying, brush, roller, etc., or the substrate is immersed into the antifouling coating, and then the antifouling paint coated or immersed on the substrate is dried and cured by using for example a drying device or manner such as natural drying (namely, drying at roughly room temperature) or a heater, thereby forming the antifouling coating on the substrate.

In the following examples, the lacing film performance rating criteria for samples with antifouling coatings are shown in Table 1.

TABLE 1

| Grades | Fouling coverage area |
| --- | --- |
| 0 | less than 3% |
| 1 | 4%-10% |
| 2 | 11%-15% |
| 3 | 16%-25% |
| 4 | 26%-45% |
| 5 | more than 45% |

Compositions of various antifouling paints in examples 1-9 and lacing film performances of coatings formed by the antifouling paints are shown in Table 2.

TABLE 2

| | Compositions of paint (unit: wt %) | Examples | | | | | | | | |
| --- | --- | --- | --- | --- | --- | --- | --- | --- | --- | --- |
| | | 1 | 2 | 3 | 4 | 5 | 6 | 7 | 8 | 9 |
| A | Self-polishingacrylic resin | / | 85.5 | 85.5 | 77 | / | 77 | 68 | 68 | / |
| | Abrasive resin | 71.5 | / | / | / | 65 | / | / | / | 58 |
| B | Organic bentonite | 3 | 3 | 3 | 2 | 2 | 2 | 1 | 1 | 1 |
| | Xylene | 10 | 10 | 10 | 10 | 10 | 10 | 10 | 10 | 10 |
| | Rosin | 12 | / | / | / | 10 | / | / | / | 8 |
| | Plasticizer | 2 | / | / | / | 2 | / | / | / | 2 |
| | Anti-settling agent | 0.5 | 0.5 | 0.5 | 1 | 1 | 1 | 1 | 1 | 1 |
| C | Antifouling composition | 1 | 1 | 1 | 10 | 10 | 10 | 20 | 20 | 20 |
| | Types | Mass ratio of compound of formula I:compound of formula II:compound of formula III | | | | | | | | |
| | Ratio | 1:1:1 | 1:1:0 | 0:0:1 | 1:1:1 | 1:1:0 | 0:0:1 | 1:1:1 | 1:1:0 | 0:0:1 |
| | x = y | 1 | 5 | 0 | 0 | 1 | 2 | 2 | 0 | 0 |
| | Fouling grade | 1 | 2 | 1 | 1 | 1 | 1 | 0 | 0 | 0 |
| | Lacing film time (peak growth season) | 1 | 1 | 1 | 1 | 1 | 1 | 1 | 1 | 1 |

Note:

the values of x and y in compound of formula I, compound of formula II and compound of formula III in Table 2 are the same; and wherein data in column D are average values of multiple measured samples.

Compositions of various antifouling paints in examples 10-18 and lacing film performances of coatings formed by the antifouling paints are shown in Table 3.

TABLE 3

| | Compositions of paint (unit: wt %) | Examples | | | | | | | | |
|---|---|---|---|---|---|---|---|---|---|---|
| | | 10 | 11 | 12 | 13 | 14 | 15 | 16 | 17 | 18 |
| A | Self-polishingacrylic resin | / | 85.5 | 85.5 | 77 | / | 77 | 68 | 68 | / |
| | Abrasive resin | 71.5 | / | / | / | 65 | / | / | / | 58 |
| B | Organic bentonite | 3 | 3 | 3 | 2 | 2 | 2 | 1 | 1 | 1 |
| | Xylene | 10 | 10 | 10 | 10 | 10 | 10 | 10 | 10 | 10 |
| | Rosin | 12 | / | / | / | 10 | / | / | / | 8 |
| | Plasticizer | 2 | / | / | / | 2 | / | / | / | 2 |
| | Anti-settling agent | 0.5 | 0.5 | 0.5 | 1 | 1 | 1 | 1 | 1 | 1 |
| C | Antifouling composition | 1 | 1 | 1 | 10 | 10 | 10 | 20 | 20 | 20 |
| | Types | Mass ratio of compound of formula IV:compound of formula V:compound of formula VI | | | | | | | | |
| | Ratio | 1:1:1 | 1:1:0 | 0:0:1 | 1:1:1 | 1:1:0 | 0:0:1 | 1:1:1 | 1:1:0 | 0:0:1 |
| | x = y | 0 | 3 | 1 | 0 | 1 | 2 | 4 | 0 | 0 |
| | M | Cu | Cu | Ag | Cu | Cu | Ag | Zn | Cu | Ag |
| | Fouling grade | 1 | 1 | 1 | 1 | 1 | 0 | 0 | 0 | 0 |
| | Lacing film time (peak growth season) | 1 | 1 | 1 | 1 | 1 | 1 | 1 | 1 | 1 |

Note:
the values of x and y in compound of formula IV, compound of formula V and compound of formula VI in the same antifouling composition in Table 3 are the same, and M is the same; and wherein data in column D are average values of multiple measured samples.

Compositions of various antifouling paints in examples 19-27 and lacing film performances of coatings formed by the antifouling paints are shown in Table 4.

TABLE 4

| | Compositions of paint (unit: wt %) | Examples | | | | | | | | |
|---|---|---|---|---|---|---|---|---|---|---|
| | | 19 | 20 | 21 | 22 | 23 | 24 | 25 | 26 | 27 |
| A | Self-polishingacrylic resin | / | 85.5 | 85.5 | 77 | / | 77 | 68 | 68 | / |
| | Abrasive resin | 71.5 | / | / | / | 65 | / | / | / | 58 |
| B | Organic bentonite | 3 | 3 | 3 | 2 | 2 | 2 | 1 | 1 | 1 |
| | Xylene | 10 | 10 | 10 | 10 | 10 | 10 | 10 | 10 | 10 |
| | Rosin | 12 | / | / | / | 10 | / | / | / | 8 |
| | Plasticizer | 2 | / | / | / | 2 | / | / | / | 2 |
| | Anti-settling agent | 0.5 | 0.5 | 0.5 | 1 | 1 | 1 | 1 | 1 | 1 |
| C | Antifouling composition | 1 | 1 | 1 | 10 | 10 | 10 | 20 | 20 | 20 |
| | Types | a (a mixture of any one or more of compounds of formula I, formula II and formula III), b | | | | | | | | |
| | Ratio | 1:1 | 6:4 | 4:6 | 1:1 | 7:3 | 8:2 | 1:1 | 1:9 | 2:8 |
| | x = y | 0 | 3 | 1 | 0 | 1 | 0 | 4 | 0 | 1 |
| | M contained in b | Cu | Cu | Cu | Cu | Cu | Cu | Cu | Cu | Cu |
| D | Fouling grade | 2 | 2 | 1 | 1 | 1 | 0 | 0 | 0 | 0 |
| | Lacing film time (peak growth season) | 1 | 1 | 1 | 1 | 1 | 1 | 1 | 1 | 1 |

Note:

in table 4, a is a mixture of any one or more of compounds of formula I, formula II and formula III, b is a mixture of any one or more of compounds of formula IV, formula V and formula VI, and the values of x and y in various compounds in the same antifouling composition are the same; and wherein data in column D are average values of multiple measured samples.

The lacing film pictures of typical samples in example 1, example 2, example 3, example 6, example 7, example 8, example 10, example 11, example 12, example 16, example 17, example 18, example 19, example 20, example 21, example 25, example 26 and example 27 are shown in FIG. 1, FIG. 2, FIG. 3, FIG. 4, FIG. 5, FIG. 6, FIG. 7, FIG. 8, FIG. 9 FIG. 10, FIG. 11, FIG. 12, FIG. 13, FIG. 14, FIG. 15, FIG. 16, FIG. 17 and FIG. 18.

Compositions of various antifouling paints in comparative examples 1-9 and lacing film performances of coatings formed by the antifouling paints are shown in Table 5.

TABLE 5

| | Compositions of paint (unit: mass ratio) | \multicolumn{9}{c}{Comparative examples} |
|---|---|---|---|---|---|---|---|---|---|---|
| | | 1 | 2 | 3 | 4 | 5 | 6 | 7 | 8 | 9 |
| A | Self-polishing acrylic resin | / | 85 | / | 40 | / | / | 65 | / | 55 |
| | Abrasive resin | 70 | / | / | / | 30 | 50 | / | 40 | / |
| B | Organic bentonite | 3 | 3 | / | 1 | 3 | 3 | 3 | 3 | 3 |
| | Xylene | 10 | 10 | / | 4 | 10 | 10 | 10 | 10 | 10 |
| | Rosin | 15 | / | / | / | 10 | 15 | / | 15 | / |
| | Plasticizer | 2 | 2 | / | / | 2 | 2 | 2 | 2 | 2 |
| | Anti-setting agent | / | v/ | / | / | / | / | / | / | / |
| | Cuprous oxide | / | / | / | 40 | 40 | 10 | 10 | 20 | 20 |
| | Zinc oxide | / | / | / | 8 | 3 | 5 | 5 | 5 | 5 |
| | Zineb | / | / | / | 5 | / | / | / | / | / |
| | DCOIT | / | / | / | 2 | 2 | 5 | 5 | 5 | 5 |
| | Fouling grade | 4 | 3 | 5 | 1 | 1 | 4 | 3 | 3 | 3 |
| | Lacing time (peak growth season) | 1 | 1 | 1 | 1 | 1 | 1 | 1 | 1 | 1 |

Note:
data in column D in Table 5 are average values of multiple measured samples.

The lacing film pictures of typical samples in comparative example 1, comparative example 2, comparative example 3, comparative example 4, comparative example 6 and comparative example 8 are shown in FIG. 19, FIG. 20, FIG. 21, FIG. 22, FIG. 23 and FIG. 24 respectively.

In addition, the antifouling coating provided by the embodiment of the present application can also be cooperatively used with a known anticorrosive layer and the like.

Figure 1:
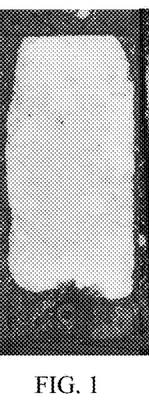
FIG. 1-FIG. 18 are pictures of lacing films of various typical samples in examples 1, 2, 3, 6, 7, 8, 10, 11, 12, 16, 17, 18, 19, 20, 21, 25, 26 and 27.
Figure 2:
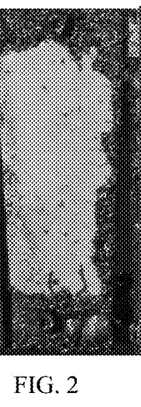
Figure 3:
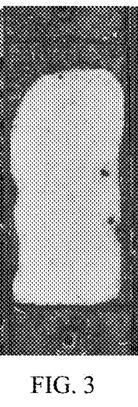
Figure 4:
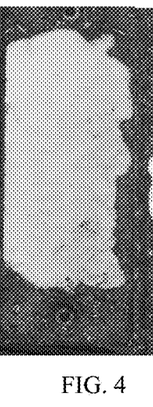
Figure 5:
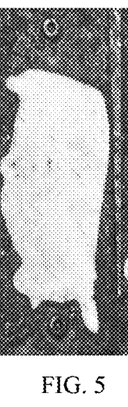
Figure 6:
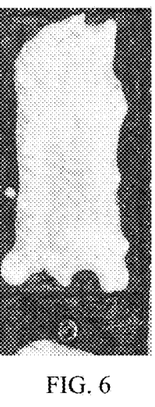
Figure 7:
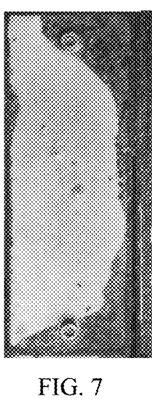
Figure 8:
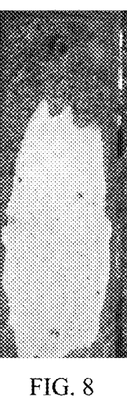
Figure 9:
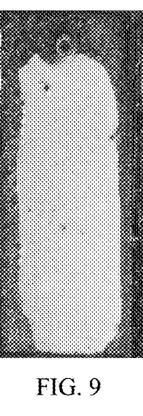
Figure 10:
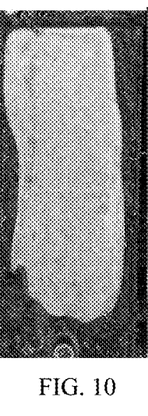
Figure 11:
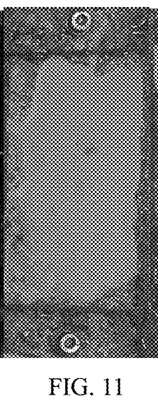
Figure 12:
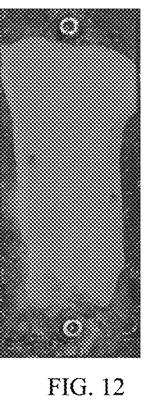
Figure 13:
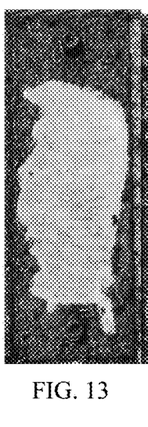
Figure 14:
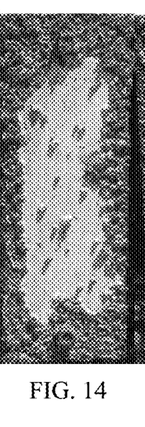
Figure 15:
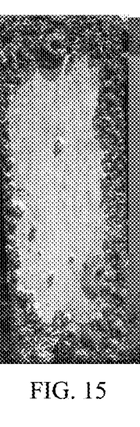
Figure 16:
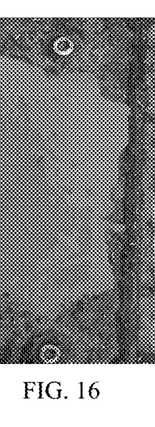
Figure 17:
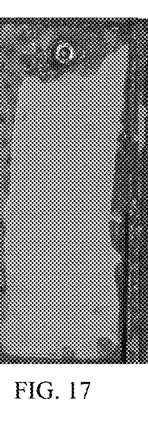
Figure 18:
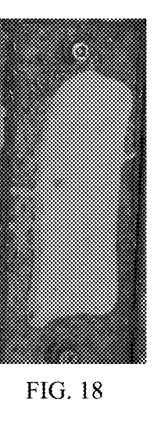
Figure 19:
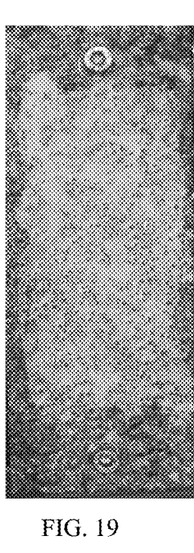
FIG. 19-FIG. 24 are pictures of lacing films of various typical samples in comparative examples 1, 2, 3, 4, 6 and 8.
Figure 20:
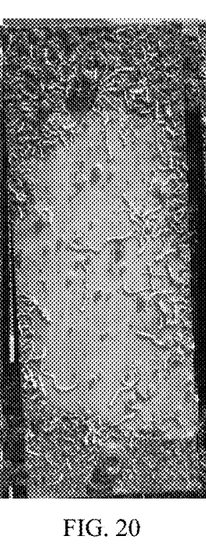
Figure 21:
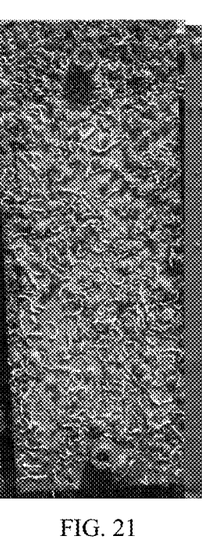
Figure 22:
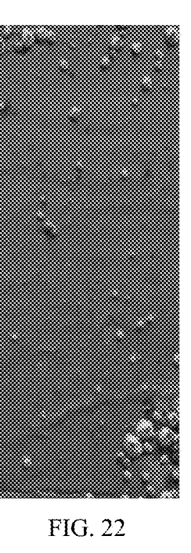
Figure 23:
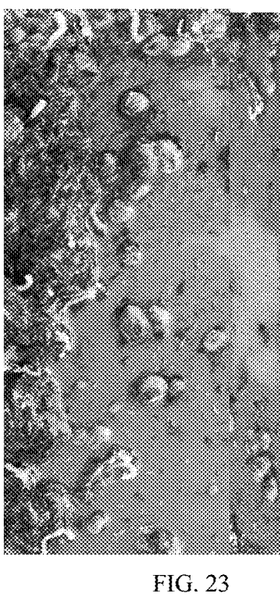
Figure 24:
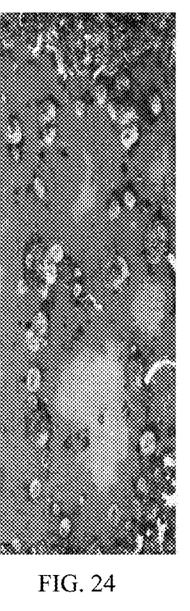
Figure 25:
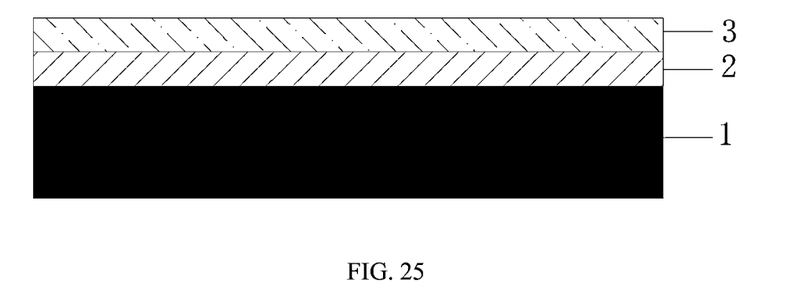
FIG. 25 is a diagram of a multi-layer protective film structure in an application example of the present application.

For example, in a typical application example, provided is a multi-layer protective film structure, referring to FIG. 25. The multi-layer protective film structure covers on the surface of a carbon steel substrate 1, including anticorrosive coatings 2 (graphene epoxy composite anticorrosive coating) and antifouling coatings 3 which are successively superposed. The preparation method of the multi-layer protective film structure comprises:

1) 0.25 g of poly (2-butyl aniline) nanofibers (with a diameter of about 50 nm and a length of 0.7 μM) and 0.25 g of graphene nano sheet (with a thickness of about 3-5 nm) were dispersed in 50 mL of acetone for 1 h to prepare a graphene dispersion, and then the graphene dispersion was mixed with 32 g of epoxy resin (model E44, purchased from Jiangsu Wujiang Heli resin factory), 2 g of leveling agent (ethylene glycol butyl ether or cellulose acetate, etc.), 2 g of anti-sedimentation agent (vapor silica or organic bentonite, etc.), 3 g of mineral oil defoamer and 8 g of xylene reagent were mechanically stirred for 30 minutes to obtain component I, and 10 g of polyamide 650 and 4 g of xylene solution were evenly mixed to obtain component II. Then, the component I and the component II were mixed in a mass ratio of 100:80 and stirred with a high-speed mixer for 30 min to obtain a graphene epoxy composite paint containing 0.5 wt % graphene, then, the graphene epoxy composite paint was sprayed on the carbon steel substrate. After the solvent was volatilized, the graphene epoxy composite anticorrosive coating with a thickness of 20-50 microns was obtained;

2) an antifouling coating with a thickness of 20-50 microns was formed on the graphene epoxy composite anticorrosive paint by using any antifouling coating mentioned in examples 1-27.

The antifouling and anticorrosive performance of the multilayer protective film structure is tested. The results show that the antifouling performance of the multilayer protective film structure is improved by more than 5% compared with that of the antifouling coating alone, and its anticorrosive performance is improved by 15% compared with that of the anticorrosive coating alone.

It should be understood that the above embodiments are parts of the embodiments of the present application, not all the embodiments. The detailed description of the embodiments of the present application is not intended to limit the scope of the present application, but only represents the selected embodiments of the present application. Based on the embodiments in the present application, all other embodiments obtained by those skilled in the art without creative efforts belong to the scope of protection of the present application.

What is claimed is:

1. A method of preparing an antifouling agent comprising the step of combining one or two of E-isomers of the compound of formula III and one or two of E-isomers of the compound of formula IV:

III

-continued

IV wherein a value of x and a value of y are 0-5, and M comprises Cu, Zn or Ag.

2. The method according to claim 1, wherein x=y.

3. The method according to claim 1, wherein the value of x and the value of y are 0 or 1.

4. The method according to claim 1, wherein M is Cu.

5. The method according to claim 1, wherein a content of the E-isomers of the compound of formula III is more than 50 wt % and less than 100 wt %.

6. The method according to claim 1, wherein a content of the E-isomers of the compound of formula IV is more than 50 wt % and less than 100 wt %.

7. The method according to claim 1, wherein a total content of the E-isomers of the compound of formula III and the E-isomers of the compound of formula IV is more than 50 wt %.

8. An environmental-friendly antifouling paint, comprising a resin main body and an antifouling agent, wherein the antifouling agent comprises one or two of the E-isomers of the compound of formula III and one or two of the E-isomers of the compound of formula IV:

wherein a value of x and a value of y are 0-5, and M comprises Cu, Zn or Ag.

9. The environmental-friendly antifouling paint according to claim 8, wherein the resin main body comprises a self-polishing resin comprising an acrylic resin or a methyl methacrylate resin or an abrasive resin comprising an acrylic resin, a chlorinated rubber, a chlorinated olefin resin or a styrene/butadiene copolymer resin.

10. The environmental-friendly antifouling paint according to claim 8, further comprising an additive wherein the additive comprises a combination of any one or more of an extender, a solvent, a spontaneous accelerator, a carrier, an emulsifier, a dispersant, an antifreeze, a biocide and a thickener.

11. The environmental-friendly antifouling paint according to claim 8, wherein a content of the antifouling agent in the environmental-friendly antifouling paint is less than 20 wt %.

12. The environmental-friendly antifouling paint according to claim 11, wherein the content of the antifouling agent in the environmental-friendly antifouling paint is 10 wt %-20 wt %.

13. A method of preparing an antifouling paint comprising the step of combining one or two of E-isomers of the compound of formula III and one or two of E-isomers of the compound of formula IV:

with a resin and optionally an additive, wherein a value of x and a value of y are 0-5, and M comprises Cu, Zn or Ag.

14. A multi-layer protective film structure, comprising at least one anticorrosive coating and at least one antifouling coating superposed, wherein the at least one antifouling coating is formed by the environmental-friendly antifouling paint according to claim 8.

15. The multi-layer protective film structure according to claim 14, wherein the resin main body comprises a self-polishing resin comprising an acrylic resin or a methyl methacrylate resin or an abrasive resin comprising an acrylic resin, a chlorinated rubber, a chlorinated olefin resin or a styrene/butadiene copolymer resin.

16. The multi-layer protective film structure according to claim 14, wherein the antifouling paint further comprises an additive and said additive comprises a combination of any one or more of an extender, a solvent, a spontaneous an accelerator, a carrier, an emulsifier, a dispersant, an antifreeze, a biocide and a thickener.

17. A device, comprising:
a substrate;
and the multi-layer protective film structure according to claim 14 covering the substrate.

* * * * *